US012372901B2

(12) United States Patent
Nagamine

(10) Patent No.: US 12,372,901 B2
(45) Date of Patent: Jul. 29, 2025

(54) IMAGE FORMING APPARATUS

(71) Applicant: CANON KABUSHIKI KAISHA, Tokyo (JP)

(72) Inventor: Shogo Nagamine, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/423,967

(22) Filed: Jan. 26, 2024

(65) Prior Publication Data

US 2024/0255869 A1 Aug. 1, 2024

(30) Foreign Application Priority Data

Jan. 27, 2023 (JP) ................................ 2023-010974

(51) Int. Cl.
*G03G 15/16* (2006.01)
*G03G 15/00* (2006.01)

(52) U.S. Cl.
CPC ..... *G03G 15/1685* (2013.01); *G03G 15/6502* (2013.01); *G03G 15/6558* (2013.01)

(58) Field of Classification Search
CPC ........... G03G 21/1821; G03G 21/1825; G03G 21/1842; G03G 21/1647
See application file for complete search history.

(56) References Cited

U.S. PATENT DOCUMENTS

| | | | | |
|---|---|---|---|---|
| 7,751,762 B2 * | 7/2010 | Hatayama | G03G 15/1605 399/302 |
| 8,014,701 B2 | 9/2011 | Nakura et al. | |
| 11,662,675 B2 | 5/2023 | Tezuka | |
| 2012/0003006 A1 * | 1/2012 | Tachiki | G03G 15/1605 399/302 |
| 2012/0251193 A1 * | 10/2012 | Ohashi | G03G 15/0136 399/299 |
| 2015/0125181 A1 | 5/2015 | Oguni | |
| 2021/0080858 A1 * | 3/2021 | Yamamoto | G03G 15/0813 |

FOREIGN PATENT DOCUMENTS

| | | |
|---|---|---|
| JP | 06-167899 A | 6/1994 |
| JP | 07-302007 A | 11/1995 |
| JP | 2009-145784 A | 7/2009 |
| JP | 2015-090402 A | 5/2015 |
| JP | 2022-131519 A | 9/2022 |

* cited by examiner

*Primary Examiner* — Jessica L Eley
(74) *Attorney, Agent, or Firm* — Venable LLP

(57) ABSTRACT

An image forming apparatus includes an image bearing member, a transfer member movably provided between a contact position and a separated position, first and second bearings, a supporting member, first and second urging members for urging the first and second bearings, respectively, and a moving member provided with first and second engaging portions engaging with the first and second bearings, respectively. At least a part of the moving member is disposed on the same side as the transfer member with respect to the supporting member in a moving direction. As viewed in a recording material conveyance direction, the moving member and the transfer member are overlapped with each other in a state in which the transfer member is positioned in the separated position.

14 Claims, 10 Drawing Sheets

IMAGE FORMING APPARATUS

FIELD OF THE INVENTION AND RELATED ART

The present invention relates to an image forming apparatus for forming an image on a recording material.

In the image forming apparatus of an electrophotographic method, a toner image formed on an image bearing member such as photosensitive drum is transferred to the recording material by a transfer member. According to Japanese Patent Application Laid-open No. 2015-090402, it is disclosed that in order to avoid adverse effects such as deformation of a transfer roller due to long-term pressure contact between the transfer roller and the photosensitive drum, the transfer roller is held in a separated position in which the transfer roller is separated from the photosensitive drum by a lock member, which engages a bearing of the transfer roller.

SUMMARY OF THE INVENTION

According to an aspect of the present invention, there is provided an image forming apparatus comprising: a rotatable image bearing member configured to bear an image; a rotatable transfer member configured to form a transfer portion between itself and the image bearing member and to transfer the image from the bearing member to a recording material in the transfer portion, the transfer member being movable between a contact position in contact with the image bearing member and a separated position separated from the image bearing member in a moving direction crossing both a rotational axis direction of the transfer member and a recording material conveyance direction in the transfer portion; a first bearing configured to rotatably support a first end portion of the transfer member in the rotational axis direction and movably provided in the moving direction; a second bearing configured to rotatably support a second end portion of the transfer member in the rotational axis direction and movably provided in the moving direction; a supporting member opposing the first bearing and the second bearing with respect to the moving direction; a first urging member of which one end is supported by the supporting member and the other end is connected to the first bearing and configured to urge the first bearing in a direction from the separated position toward the contact position of the transfer member; a second urging member of which one end is supported by the supporting member and the other end is connected to the second bearing and configured to urge the second bearing in the direction from the separated position toward the contact position of the transfer member; and a moving member provided with a first engaging portion engaging with the first bearing and a second engaging portion engaging the second bearing and movably provided in a direction along the rotational axis direction between a first position where the first engaging portion engages with the first bearing and the second engaging portion engages with the second bearing so as to hold the transfer member at the separated position and a second position where the first engaging portion is disengaged from the first bearing and the second engaging portion is disengaged from the second bearing so as to permit the transfer member to move from the separated position to the contact position, wherein at least a part of the moving member is disposed on the same side as the transfer member with respect to the supporting member in the moving direction, and wherein as viewed in the recording material conveyance direction, the moving member and the transfer member are overlapped with each other in a state in which the transfer member is positioned in the separated position.

Further features of the present invention will become apparent from the following description of exemplary embodiments with reference to the attached drawings.

DESCRIPTION OF THE EMBODIMENTS

In the following, embodiments of the present invention will be specifically described with reference to Figures.

Embodiment 1

Figure 1:
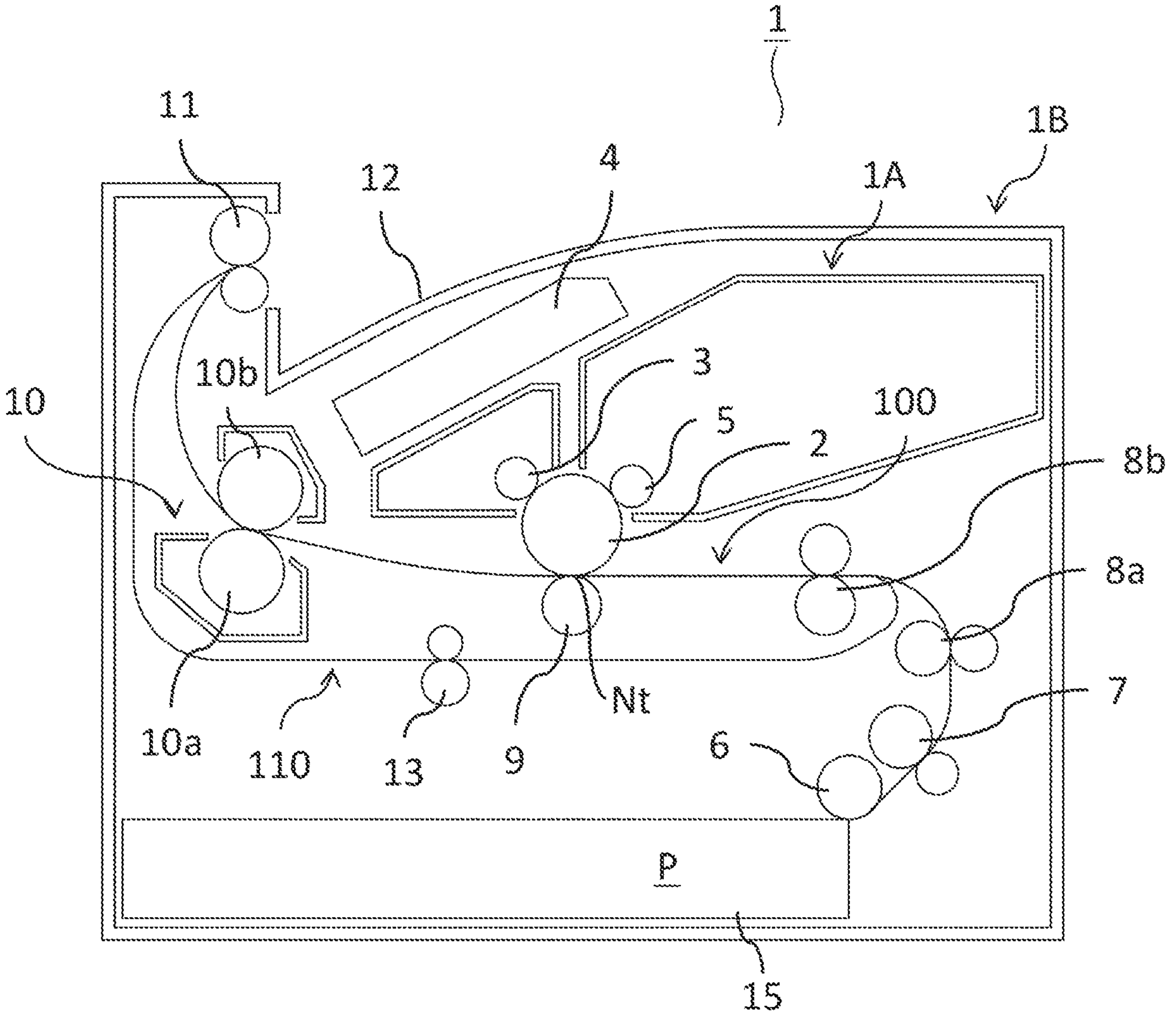
FIG. 1 is a schematic view of an image forming apparatus according to an Embodiment 1.

FIG. 1 is a schematic view illustrating a cross-sectional configuration of an image forming apparatus 1 according to an Embodiment 1. The image forming apparatus 1 is a laser beam printer which forms an image on a recording material P based on image information received from an external device. Incidentally, in the present disclosure, the "image forming apparatus" is not limited to a single-function printer, but may also be a copy machine, a multifunction machine, a commercial printing machine, etc. In addition, as the recording material (recording medium) P, a variety of sheet materials of different sizes and materials can be used, for example, a paper such as a plain paper and a thick paper, a sheet material with a surface treatment such as a coated paper, a special shaped sheet material such as an envelope and an index paper, a plastic film, a cloth, etc.

The image forming apparatus 1 is provided with a process unit 1A (image forming unit), which forms an image (toner image) on the recording material P by an electrophotographic process, and a fixing unit 10 to fix the image onto the recording material P. The process unit 1A includes a photosensitive drum 2 as an image bearing member, a charging roller 3 as a charging means, a laser scanner 4 as an exposure means, and a developing roller 5 as a developing means, and a transfer roller 9 as a transfer member. A part or all of the process unit 1A may be a process cartridge, which is attachable to and detachable from an apparatus main body 1B of the image forming apparatus 1. In the present Embodiment, the apparatus main body 1B refers to a part which is the image forming apparatus 1 minus the process unit 1A.

The photosensitive drum 2 is an electrophotographic photosensitive member formed in a drum shape (cylindrical shape). In addition, in the process unit 1A, toner as a developer is accommodated. The transfer roller 9 is disposed opposing the photosensitive drum 2. As a nip portion between the photosensitive drum 2 and the transfer roller 9, a transfer portion Nt, in which a transfer of the image (toner image) from the image bearing member to the recording material P is performed, is formed.

The fixing unit 10 is a device of a thermal fixing method, which fixes the image to the recording material P by heating the image (toner image). The fixing unit 10 is provided with, for example, a roller pair, which is constituted by a pressing roller 10*a* and a fixing roller 10*b*, and a heating means such as a halogen lamp, which heats the fixing roller 10*b*.

In addition, the image forming apparatus 1 is provided with a feeding tray 15, a pickup roller 6, a feeding roller pair 7, conveyance roller pairs 8*a* and 8*b*, a discharging roller pair 11, a discharge tray 12 and a double side roller pair 13. The feeding tray 15 is an example of an accommodating portion in which the recording material P used for an image formation is accommodated. The pickup roller 6 and the feeding roller pair 7 are examples of a feeding means, which feeds the recording material P one sheet at a time. The discharging roller pair 11 is an example of a discharging means, which discharges the recording material P, on which the image formation has been completed, outside the apparatus. The discharge tray 12 is an example of a stacking portion, on which the recording material P discharged out of the apparatus is stacked.

Furthermore, the image forming apparatus 1 is provided with a conveyance path of the recording material P including a first conveyance path 100 and a second conveyance path 110. The first conveyance path 100 is a conveyance path from the conveyance roller pair 8*b*, through the transfer portion Nt and the fixing unit 10, to the discharging roller pair 11. The second conveyance path 110 is a conveyance path from the discharging roller pair 11 through the double side roller pair 13 and merges with the first conveyance path 100 upstream of the conveyance roller pair 8*b*. The first conveyance path 100 is a conveyance path where the image formation is performed on the recording material P, and the second conveyance path 110 is a conveyance path where the recording material once passed through the first conveyance path 100 is conveyed again toward the first conveyance path 100.

(Image Forming Operation)

A series of operations in which the image forming apparatus 1 forms an image on the recording material P (image forming operation) will be described. When the image forming apparatus 1 receives the image information, the image forming operation is initiated. First, the recording material P is fed from the feeding tray 15 by the pickup roller 6, and one sheet of the recording material P is fed in a separated state by the feeding roller pair 7. The recording material P is conveyed by the conveyance roller pairs 8*a* and 8*b* to the transfer portion Nt.

In parallel with the feeding and the conveyance of the recording material P, the process unit 1A forms the toner image. The photosensitive drum 2 is rotationally driven, and the charging roller 3 uniformly charges a surface of the photosensitive drum 2. The laser scanner 4 performs an exposure process by irradiating the photosensitive drum 2 with a laser beam, which is modulated according to a video signal generated based on the image information, to form an electrostatic latent image on the surface of the photosensitive drum 2. The developing roller 5 bears the toner as a developer and supplies the toner to the photosensitive drum 2 to develop the electrostatic latent image into the toner image. And when the recording material P, which is conveyed from the conveyance roller pair 8*b*, passes through the transfer portion Nt, the transfer roller 9 transfers the toner image from the photosensitive drum 2 to the recording material P.

After passing through the transfer portion Nt, the recording material P is conveyed to the fixing unit 10. The fixing unit 10 fixes the toner image on the recording material P by heating and pressuring the toner image on the recording material P while nipping and conveying the recording material P with a nip portion (fixing nip) between the pressing roller 10*a* and the fixing roller 10*b*. As such, while the recording material P is conveyed through the first conveyance path 100, the image is formed on one side of the recording material P.

In a case of a single-side image formation (single-side printing), the recording material P, of which the image is formed on the first surface while being conveyed through the first conveyance path 100, is discharged out of the apparatus by the discharging roller pair 11 and stacked on the discharge tray 12. In a case of a double-side image formation (double-side printing), the recording material P, of which the image is formed on the first surface while being conveyed through the first conveyance path 100, is reversely conveyed (switched back) and is sent to the second conveyance path 110. The recording material P sent to the second conveyance path 110 is conveyed to the conveyance roller pair 8*b* of the first conveyance path 100 via the double side roller pair 13. And the recording material P, of which the image is formed on a second surface opposite to the first surface while being conveyed through the first conveyance path 100 again, is discharged out of the apparatus by the discharging roller pair 11 and stacked on the discharge tray 12.

(Holding Configuration of the Transfer Roller)

A holding configuration of the transfer roller 9, a mechanism for holding the transfer roller 9 in a separated position from the photosensitive drum 2 (hereinafter referred to as a transfer separating mechanism 90), and a mechanism for releasing the holding by the transfer separating mechanism 90 (hereinafter referred to as a releasing unit 60) will be described.

In the following description and Figures, a direction along a rotational axis of the photosensitive drum 2 is referred to as a rotational axis direction D1. A direction perpendicular to the rotational axis direction D1 and along a moving direction of the recording material P in the transfer portion Nt is referred to as a recording material conveyance direction D2. A direction crossing both the rotational axis direction D1 and the recording material conveyance direction D2, and in which the transfer roller 9 is pressed toward the photosensitive drum 2, is referred to as a pressing direction D3. The rotational axis direction D1, the recording material conveyance direction D2 and the pressing direction D3 are preferably perpendicular to each other. In addition, in the present Embodiment, the rotational axis direction D1 is substantially parallel to a rotational axis direction of the transfer roller 9.

Figure 2:
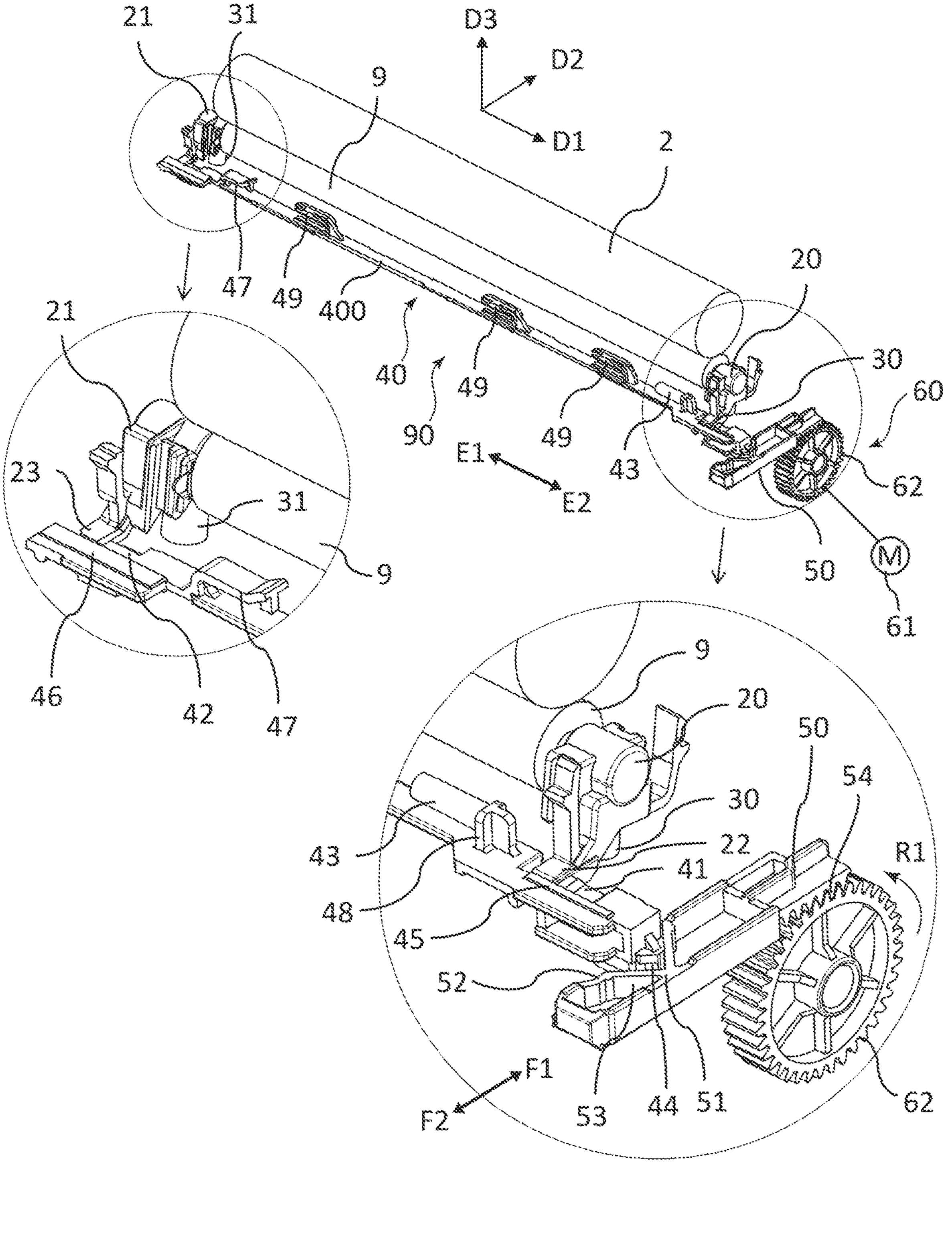
FIG. 2 is a perspective view to illustrate a transfer separating mechanism and a releasing unit according to the Embodiment 1.
Figure 3:
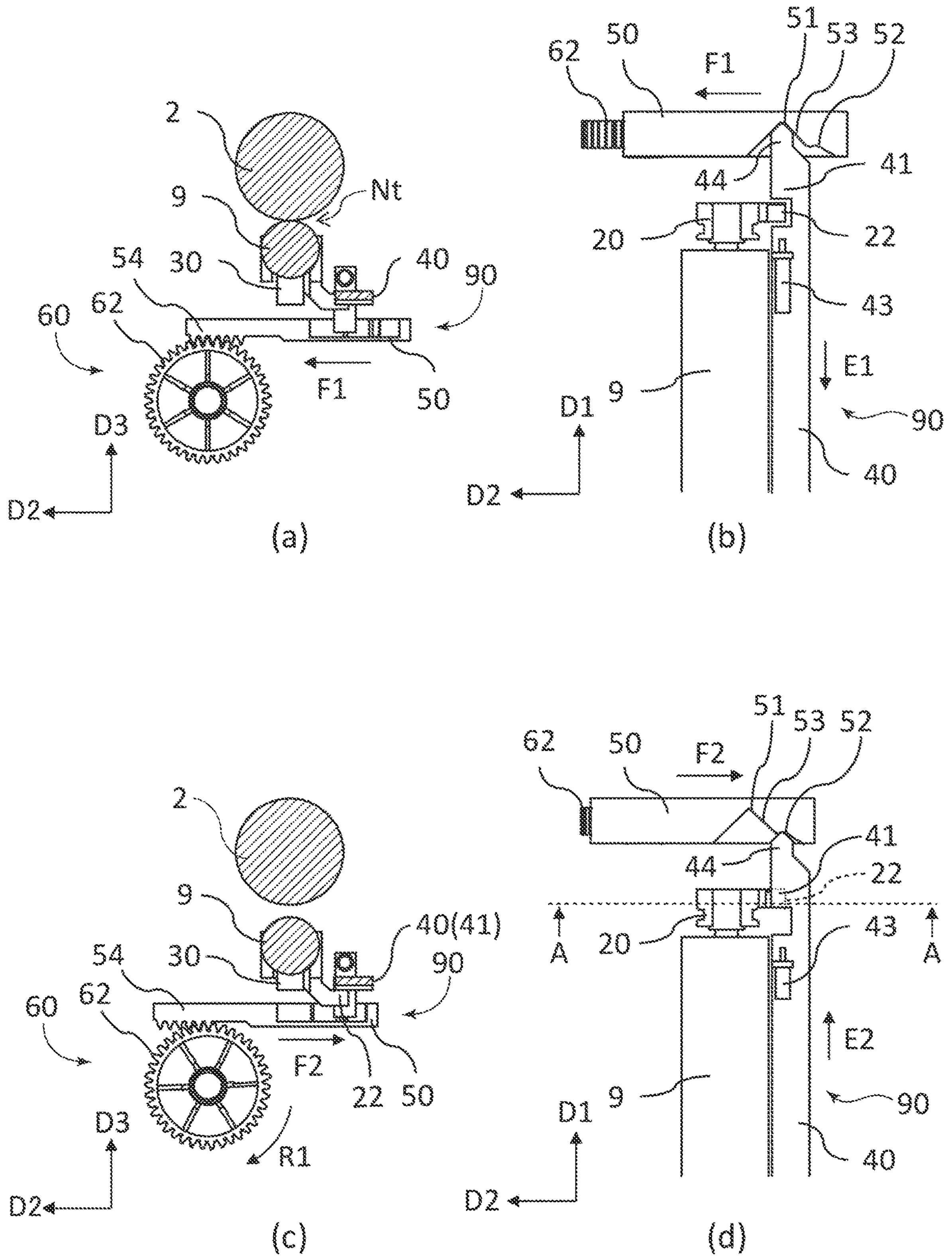
FIG. 3, part (a), part (b), part (c) and part (d), is a view to illustrate the transfer separating mechanism and the releasing unit according to the Embodiment 1.
Figure 4:
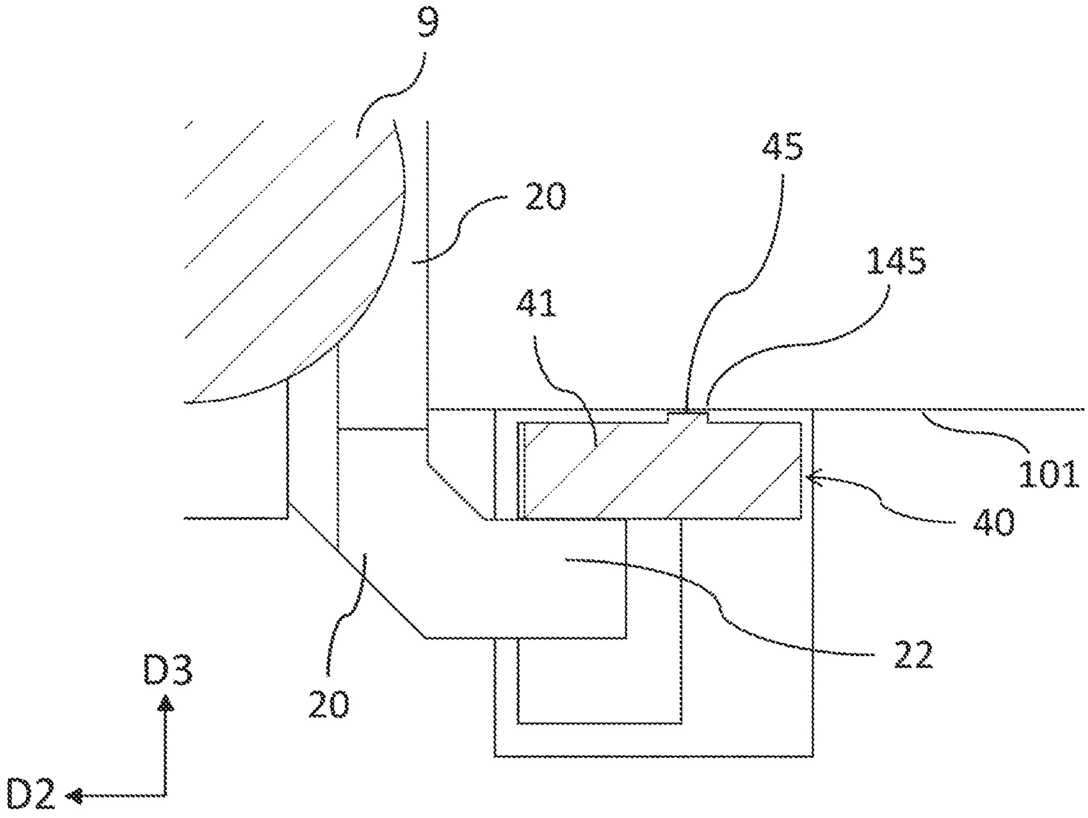
FIG. 4 is a view to illustrate the transfer separating mechanism according to the Embodiment 1.

FIG. 2 is a perspective view of the transfer separating mechanism 90, the releasing unit 60, the transfer roller 9 and the photosensitive drum 2, and an enlarged view of a portion thereof. Part (a) and part (c) of FIG. 3 are views of the transfer separating mechanism 90, the releasing unit 60, the transfer roller 9 and the photosensitive drum 2 as viewed from one side of the rotational axis direction D1 (lower right side of FIG. 2). Part (b) and part (d) of FIG. 3 are views of the transfer separating mechanism 90, the releasing unit 60 and the transfer roller 9 as viewed from one side of the pressing direction D3 (upper side of part (a) of FIG. 3, etc.). FIG. 4 is a cross-sectional view illustrating a cross-section of the apparatus at a line A-A in part (d) of FIG. 3.

As shown in FIG. 2, one end portion (first end portion) of the transfer roller 9 in the rotational axis direction D1 is rotatably supported by a first bearing 20. The other end portion (second end portion) of the transfer roller 9 in the rotational axis direction D1 is rotatably supported by a second bearing 21. The first bearing 20 is urged in the pressing direction D3 by a first pressing spring 30. The second bearing 21 is urged in the pressing direction D3 by the second pressing spring 31. As a result, the transfer roller 9 is urged in the pressing direction D3 toward the photosensitive drum 2.

Each of the first bearing 20 and the second bearing 21 is movably provided in a direction crossing both the rotational axis direction D1 and the recording material conveyance direction D2 with respect to a frame member of the image forming apparatus 1. Thus, the transfer roller 9 is movable between a contact position (part (a) of FIG. 3), in which the transfer roller 9 is in contact with the photosensitive drum 2, and a separated position (part (c) of FIG. 3), in which the transfer roller 9 is separated from the photosensitive drum 2. In the present Embodiment, a moving direction of the transfer roller 9 substantially coincides with the pressing direction D3.

The first pressing spring 30 is an example of a first urging member, which urges the first bearing 20 in a direction in which the transfer member (transfer roller 9) is moved from the separated position toward the contact position. The second pressing spring 31 is an example of a second urging member which urges the second bearing 21 in the direction in which the transfer member (transfer roller 9) is moved from the separated position toward the contact position.

(Transfer Separating Mechanism)

As shown in FIG. 2, the transfer separating mechanism 90 is provided with a separation holding member 40, a slider member 50 and an urging member 43.

The separation holding member 40 is a moving member movable in a moving direction E1 and a moving direction E2, which are along the rotational axis direction D1. The separation holding member 40 of the present Embodiment is a rod-shaped or a plate-shaped member (separating rod) elongated in a direction along the rotational axis direction D1. The separation holding member 40 is urged in the predetermined moving direction E2 by the urging member 43.

The slider member 50 is a second moving member movable in a moving direction F1 and a moving direction F2 crossing the rotational axis direction D1. In the present Embodiment, the moving direction F1 and the moving direction F2 of the slider member 50 are directions substantially perpendicularly crossing with respect to the rotational axis direction D1 and along the recording material conveyance direction D2. In addition, the slider member 50 is movably provided by an assembly work of the image forming apparatus 1 or by being driven by the releasing unit 60, which will be described below.

The separation holding member 40 includes a first engaging portion 41, a second engaging portion 42, a slider contacting portion 44, a first main body contacting portion 45 and a second main body contacting portion 46.

The first engaging portion 41 is provided on one side (lower right side of FIG. 2; hereinafter, this side is referred to as a first end side) of the separation holding member 40 in the rotational axis direction D1. The second engaging portion 42 is provided on the other side (upper left side of FIG. 2; hereinafter, this side is referred to as a second end side) of the separation holding member 40 in the rotational axis direction D1.

The first bearing 20 includes a first hook portion 22 as a first engaged portion, which is engaged with the first engaging portion 41 of the separation holding member 40. The second bearing 21 includes a second hook portion 23 as a second engaged portion, which is engaged with the second engaging portion 42 of the separation holding member 40. The first hook portion 22 and the second hook portion 23 are formed so as to project in a direction crossing both the rotational axis direction D1 and the pressing direction D3. By this, as described below, it is easily realized that a configuration, which makes the separation holding member 40 engage the first hook portion 22 and the second hook portion 23, while disposing the separation holding member 40 side-by-side with respect to the transfer roller 9 can be achieved. The first hook portion 22 and the second hook portion 23 in the present Embodiment extend toward a direction along the recording material conveyance direction D2 (upstream of the recording material conveyance direction D2).

The separation holding member 40 is movable between an engaging position (holding position, part (d) of FIG. 3), in which the separation holding member 40 engages the first bearing 20 and the second bearing 21, and a releasing position (disengaged position, part (b) of FIG. 3), in which the separation holding member 40 disengages from the first bearing 20 and the second bearing 21. The engaging position is a first position in which the first engaging portion 41 of the separation holding member 40 engages the first hook portion 22 of the first bearing 20 and the second engaging portion 42 engages the second hook portion 23 of the second bearing 21. The releasing position is a second position in which the first engaging portion 41 of the separation holding member 40 is disengaged from the first hook portion 22 of the first bearing 20 and the second engaging portion 42 is disengaged from the second hook portion 23 of the second bearing 21.

When the separation holding member 40 is positioned in the engaging position, the movement of the first bearing 20 and the movement of the second bearing 21 in the pressing direction is restricted by the separation holding member 40. Therefore, the transfer roller 9 is held in the separated position against the urging force of the first pressing spring 30 and the second pressing spring 31.

When the separation holding member 40 is positioned in the releasing position, the movement restriction of the first bearing 20 and the second bearing 21 by the separation holding member 40 is released. Therefore, the transfer roller 9 is permitted to move from the separated position to the contact position according to the urging force of the first pressing spring 30 and the second pressing spring 31.

Thus, in the present Embodiment, both end portions of the transfer roller 9 are held in the separated position by the one separation holding member 40 (moving member) engaging both the first bearing 20 and the second bearing 21. In addition, the holding of both end portions of the transfer roller 9 is released by the one separation holding member 40 (moving member) being moved in the moving direction E2 along the rotational axis direction D1 and being disengaged from both the first bearing 20 and the second bearing 21. By this configuration, it becomes possible to downsize the configuration of the transfer separating mechanism 90 compared to, for example, a case in which a moving member, which engages the second bearing 21 and moves in a second direction different from a first direction, is provided separately from a moving member, which engages the first bearing 20 and moves in the first direction.

In addition, it is possible to restrict and release the movement restriction of both the first bearing 20 and the second bearing 21 by restricting and releasing the restriction of the one separation holding member 40 (moving member) in the moving direction E2. In other words, since the movement of both end portions of the transfer roller 9 can be restricted simultaneously by restricting only the movement of the one separation holding member 40 (moving member) in the moving direction E2, it becomes possible to increase degree of design freedom of the image forming apparatus 1. Incidentally, in the present Embodiment 1, as a restricting means for restricting the movement of the one separation holding member 40 (moving member) in the moving direction E2, the slider member 50 is used.

As shown in FIG. 4, the first main body contacting portion 45 of the separation holding member 40 is provided on a surface opposite to a surface, with which the first engaging portion 41 is in contact, with respect to the pressing direction D3 in the separation holding member. Similarly, the second main body contacting portion 46 of the separation holding member 40 is provided on a surface opposite to a surface, with which the second engaging portion 42 is in contact, with respect to the pressing direction D3 in the separation holding member. In other words, the first engaging portion 41 and the second engaging portion 42 are provided upstream of the separation holding member 40 in the pressing direction D3, and the first main body contacting portion 45 and the second main body contacting portion 46 are provided downstream of the separation holding member 40 in the pressing direction D3.

The first main body contacting portion 45 is facing a first restricting surface 145, which is provided on a member fixed to the frame member of the apparatus main body 1B (hereinafter, referred to as a main body frame 101; see FIG. 7), in the pressing direction D3. Similarly, the second main body contacting portion 46 is facing a second restricting surface, which is provided on the main body frame 101, in the pressing direction D3. When the separation holding member 40 is positioned in the engaging position, the urging force of the first pressing spring 30 and the second pressing spring 31 are received by the main body frame 101 by the first main body contacting portion 45 and the second main body contacting portion 46 being in contact with the main body frame 101.

The first main body contacting portion 45 and the second main body contacting portion 46 may be configured to have a rib shape. The first main body contacting portion 45 and the second main body contacting portion 46 in the present Embodiment have rib shapes having a cross-section of a projecting shape projecting in the pressing direction D3 and extending in a direction along a longitudinal direction of the separation holding member 40. By configuring the first main body contacting portion 45 and the second main body contacting portion 46 to have rib shapes, it becomes easier to determine a contact position of the separation holding member 40 (end surface of the rib shape) with respect to the main body frame 101 with high accuracy. By this, it becomes possible to increase accuracy of the position of the separation holding member 40 in the pressing direction D3, and thus accuracy of the position of the first bearing 20, the second bearing 21 and the transfer roller 9 in the pressing direction D3, in the state in which the separation holding member 40 is positioned in the engaging position.

The separation holding member 40 is urged in the moving direction E1 from the engaging position to the releasing position by the urging member 43. The urging member 43 in the present Embodiment is a compression spring provided between a spring receiving portion 48 (see lower right of FIG. 2), which is provided on a first end portion side of the separation holding member 40 with respect to the rotational axis direction D1, and a spring receiving portion 148 (see FIG. 6), which is provided in the main body frame 101. As the urging member 43, an elastic member other than the compression spring may be used.

The slider contacting portion 44 of the separation holding member 40 is a portion in contact with a first holding portion 51 or a second holding portion 52 of the slider member 50. When the slider contacting portion 44 is in contact with the first holding portion 51, the separation holding member 40 is held in the releasing position (part (b) of FIG. 3). When the slider contacting portion 44 is in contact with the second holding portion 52, the separation holding member 40 is held in the engaging position (part (d) of FIG. 3). In other words, the slider member 50 functions as a restricting means to restrict a movement of the separation holding member 40 from the engaging position.

The first holding portion 51 of the slider member 50 has a concave shape, which is concave toward the moving direction E2 (first end side of the rotational axis direction D1) when the separation holding member 40 moves from the releasing position to the engaging position. The second holding portion 52 of the slider member 50 is disposed upstream of the moving direction E2 (second end side of the rotational axis direction D1) compared to the first holding portion 51. The first holding portion 51 and the second holding portion 52 are connected by an inclined surface 53, which is inclined to the moving direction E1 and the moving direction E2. The inclined surface 53 is a guide surface, which guides the slider contacting portion 44 of the separation holding member 40 from the second holding portion 52 to the first holding portion 51 when the slider member 50 is driven in the moving direction F2 by the releasing unit 60 (part (d) of FIG. 3), which will be described below.

As shown in FIG. 2, the separation holding member 40 further includes a main body hook portion 49 and a retaining portion 47. In the present Embodiment, three main body hook portions 49 and one retaining portion 47 are disposed spaced apart from each other along the rotational axis direction D1, however, a number and a disposition can be changed as needed.

The main body hook portion 49 is formed so as to project in a direction crossing with the rotational axis direction D1 from an extending portion 400 extending in the rotational axis direction D1 between the first engaging portion 41 and the second engaging portion 42. In the present Embodiment, the extending portion 400 of the separation holding member 40 has an elongated plate shape along the rotational axis direction D1, and a projecting direction of the main body hook portion 49 with respect to the extending portion 400 is a direction along the pressing direction D3. The main body hook portion 49 is an example of an engaging portion (third engaging portion) configured to make the separation holding member 40 be held by the main body frame 101 by engaging the engaged portion 149 provided in the main body frame 101 (frame member).

Figure 6:
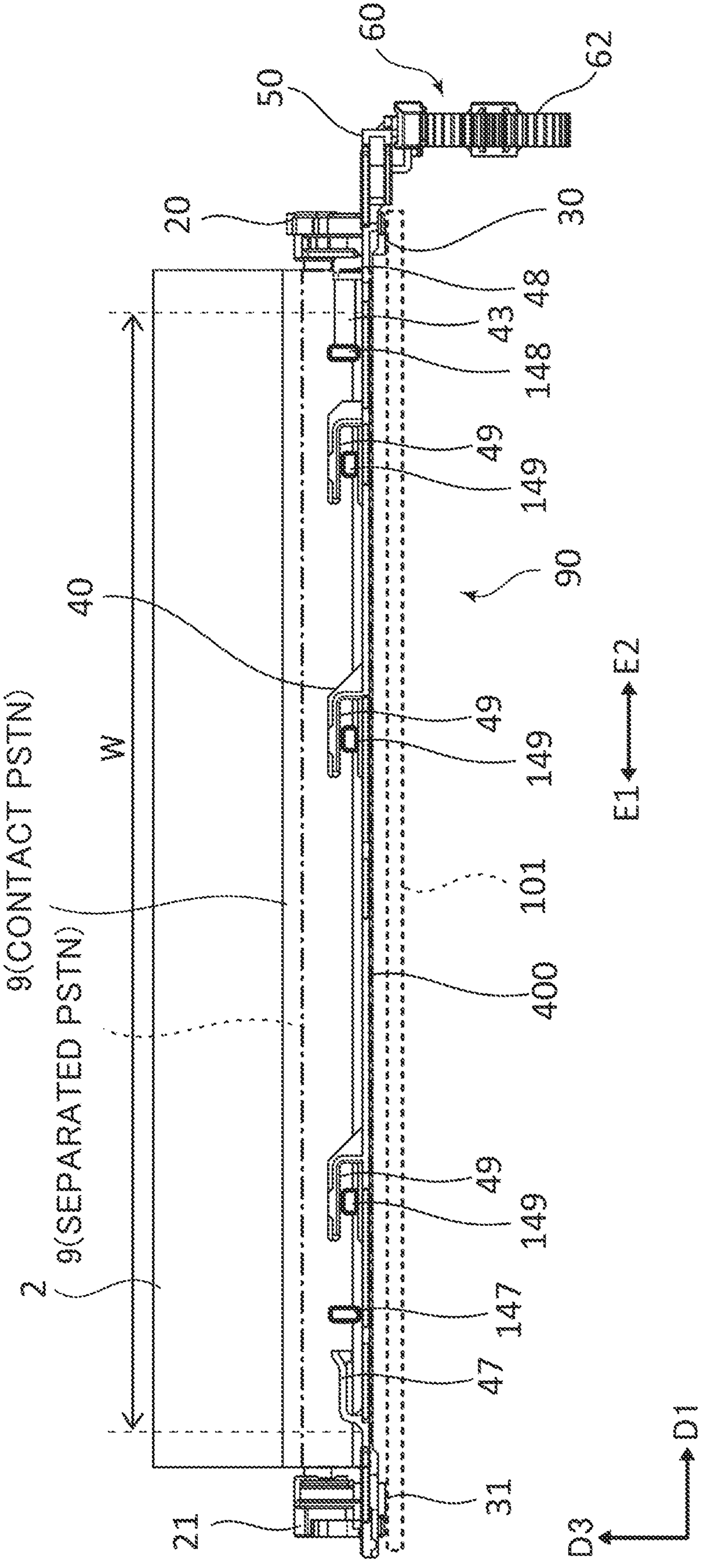
FIG. 6 is a side view to illustrate the transfer separating mechanism and the releasing unit according to the Embodiment 1.

As shown in FIG. 6, the main body hook portion 49 has a hook shape opened toward one side of the rotational axis direction D1. The main body frame 101 of the image forming apparatus 1 includes the engaged portions 149 (third engaged portions) which are engaged with the main body hook portions 49 of the separation holding member 40, respectively.

The retaining portion 47 has a projecting shape formed so as to project from the extending portion 400 in a direction crossing with the rotational axis direction D1. The retaining portion 47 is disposed so as to oppose a stopper portion 147, which is provided in the main body frame 101 of the image forming apparatus 1, in the rotational axis direction D1. A function of the main body hook portion 49 and the retaining portion 47 will be described below.

(Releasing Unit)

The releasing unit 60 will be described. The releasing unit 60 is configured to release the movement restriction of the separation holding member 40 by the slider member 50.

As shown in FIG. 2 and part (a) through part (d) of FIG. 3, the releasing unit 60 of the present Embodiment is provided with a motor 61 and a driving gear 62. The motor 61 is an example of a driving source, and as a driving source, for example, a solenoid may be used. In addition, the driving gear 62 is an example of a driving member which moves the slider member 50 as a restricting means by driving force of the driving source, and other transmission mechanisms may be used.

The driving gear 62 meshes with a rack portion 54 of the slider member 50. The driving gear 62 is driven in a rotational direction R1 by the driving force of the motor 61 being input. The slider member 50 is movable in the moving direction F2 described above by receiving the driving force from the motor 61 via the meshing of the driving gear 62 and the rack portion 54. By this, the slider member 50 is moved from a position, where the slider contacting portion 44 of the separation holding member 40 is held by the second holding portion 52 of the slider member (third position. Part (b) of FIG. 3) to a position, where the slider contacting portion 44 is held by the first holding portion 51 (fourth position. Part (d) of FIG. 3).

(Operation of the Transfer Separating Mechanism During Assembly)

An operation of the transfer separating mechanism 90 and the releasing unit 60 upon assembling the image forming apparatus 1 will be described. Hereinafter, it is assumed that the transfer roller 9, the first bearing 20 and the second bearing 21 are attached to the apparatus main assembly 1B in advance.

First, as shown in FIG. 6, an operator attaches the separation holding member 40 to the main body frame 101. In attaching the separation holding member 40, the operator moves the separation holding member 40 with respect to the main body frame 101 along the rotational axis direction D1 and engages the main body hook portion 49 with the engaged portion 149 of the main body frame 101. By the engagement of the main body hook portion 49 and the engaged portion 149, the separation holding member 40 is held by the main body frame 101 in a state movable in the moving direction E1 and the moving direction E2, which are along the rotational axis direction D1.

The retaining portion 47 is in contact with the stopper portion 147 in a case in which the main body hook portion 49 is moved in the moving direction E2 by the urging force of the urging member 43 in a state in which the hook portion 49 is engaged with the engaged portion 149. As a result, the movement of the separation holding member 40 in the moving direction E2 to the position disengaged from the engaged portion 149 is restricted, and it becomes possible to prevent the separation holding member 40 from falling off the main body frame 101.

In a state immediately after the separation holding member 40 is held by the main body frame 101, the separation holding member 40 is positioned in the releasing position as shown in part (b) of FIG. 3. The slider contacting portion 44 of the separation holding member 40 is held by the first holding portion 51 of the slider member 50. In addition, the transfer roller 9 is positioned in the contact position (part (a) of FIG. 3).

Next, the operator presses the first bearing 20 and the second bearing 21 in the opposite direction of the pressing direction D3 to move the transfer roller 9 from the contact position to the separated position. As a result, the separation holding member 40 is in a state in which the movement thereof from the releasing position to the engaging position is permitted. In this state, the operator moves the slider member 50 in the moving direction F1. Then, the separation holding member 40 is moved in the moving direction E1 from the releasing position to the engaging portion (see also part (a) of FIG. 5) by the slider contacting portion 44 of the separation holding member 40 being guided by the inclined surface 53 of the slider member 50.

When the separation holding member 40 reaches the engaging position (part (d) of FIG. 3), the operator removes his or her hand from the slider member 50. In this state, the first engaging portion 41 and the second engaging portion 42 of the separation holding member 40 engage the first hook portion 22 of the first bearing 20 and the second hook portion 23 of the second bearing 21, respectively (part (c) of FIG. 3, FIG. 4 and part (b) of FIG. 5). By this, the movement of the first bearing 20 and the second bearing 21 in the pressing direction D3 is restricted, and the transfer roller 9 is held in the separated position.

In addition, the first main body contacting portion 45 and the second main body contacting portion 46 of the separation holding member 40 is in contact with the first restricting surface 145 and the second restricting surface of the main body frame 101, respectively. As a result, the urging force of the first pressing spring 30 and the second pressing spring 31, which the separation holding member 40 receives from the first bearing 20 and the second bearing 21, is received by the main body frame 101.

Thereafter, the transfer roller 9 is held in the separated position until the separation holding member 40 is moved from the engaging position to the releasing position by the releasing unit 60.

In a case in which the transfer roller 9 is in contact with the photosensitive drum 2 during storage or transportation of the image forming apparatus 1, the following adverse effects may occur. For example, in a case in which the transfer roller 9 includes an elastic layer, plastic deformation of the elastic layer caused by the transfer roller 9 being pressed against the photosensitive drum 2 over a long period of time may occur. In addition, the transfer roller 9 or the surface of the photosensitive drum 2 may be damaged by being rubbed due to vibration during the transportation. In addition, chemical substances contained in the transfer roller 9 may seep out and adhere to the surface of the photosensitive drum 2, causing image defects. It becomes possible to reduce possibility that these adverse effects occur by having the transfer roller 9 held in the separated position by the transfer separating mechanism 90 at a time of shipment from a factory.

(Operation of the Releasing Unit)

Next, the operation in which the releasing unit 60 releases the holding of the transfer roller 9 by the transfer separating mechanism 90 will be described. The following operation is performed automatically or by an operation by a support representative as a part of an initial setup of the image forming apparatus 1 after the image forming apparatus 1 is installed in a place of use of a user.

As shown in part (c) of FIG. 3, the motor 61 is actuated and the driving gear 62 is rotationally driven in the rotational direction R1. Then, via the meshing of the rack portion 54 and the driving gear 62, the slider member 50 receives the driving force of the motor 61, and the slider member 50 moves in the moving direction F2. As a result, the slider contacting portion 44 of the separation holding member 40 is guided from the second holding portion 52 to the first holding portion 51 along the inclined surface 53. In other words, the slider member 50 releases the movement restriction of the separation holding member 40 and permits the separation holding member 40 to move from the engaging position (part (d) of FIG. 3) to the releasing position (part (b) of FIG. 3) in the moving direction E2 in accordance with the urging force of the urging member 43.

By the separation holding member 40 being moved to the releasing position (part (b) of FIG. 3), the engagement between the first engaging portion 41 and the first hook portion 22 of the first bearing 20 is released, and the engagement between the second engaging portion 42 and the second hook portion 23 of the second bearing 21 is released. As a result, the first bearing 20 and the second bearing 21 move in the pressing direction D3 in accordance with the urging force of the first pressing spring 30 and the second pressing spring 31. And the transfer roller 9 moves from the separated position to the contact position (part (a) of FIG. 3) due to the movement of the first bearing 20 and the second bearing 21.

Thus, in the present Embodiment, it is possible to easily move the transfer roller 9 from the separated position to the contact position, since it is configured that the separation holding member 40 is moved from the engaging position to the releasing position by using the driving force of the motor 61.

Incidentally, when the slider member 50 is moved to the position in part (b) of FIG. 3, the motor 61 is stopped. Thereafter, throughout a use period of the image forming apparatus 1, the slider member 50 is held in the position shown in part (b) of FIG. 3 and the separation holding member 40 is held in the releasing position (part (b) of FIG. 3).

In addition, in the present Embodiment, the separation holding member 40 is unmovable from the releasing position to the engaging position after the separation holding member 40 is moved from the engaging position to the releasing position and the transfer roller 9 is moved from the separated position to the contact position. In other words, the moving member is unmovable from the second position to the first position after the moving member has moved from the first position to the second position and the transfer member moves from the separated position to the contact position. For example, even if the separation holding member 40 is to be moved in the moving direction E1 from the releasing position to the engaging position in the state of FIG. 2, the first engaging portion 41 or the second engaging portion 42 abuts a side surface of the first hook portion 22 or the second hook portion 23, and the separation holding member 40 does not move in the moving direction E1.

(Disposition of the Separation Holding Member)

Figure 5:
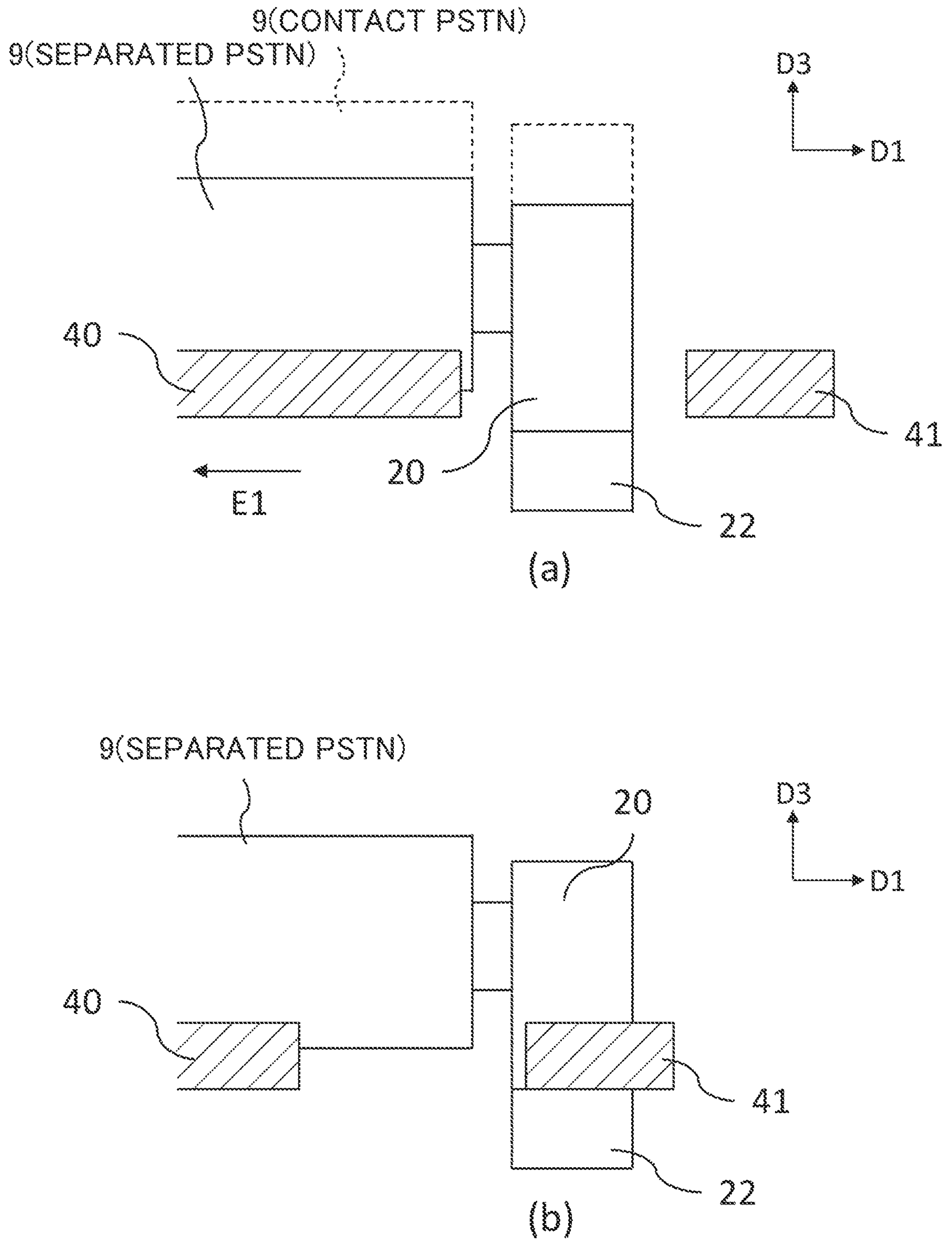
FIG. 5, part (a) and part (b), is a view illustrating positional relationship between a separation holding member and a transfer roller according to the Embodiment 1.
Figure 7:
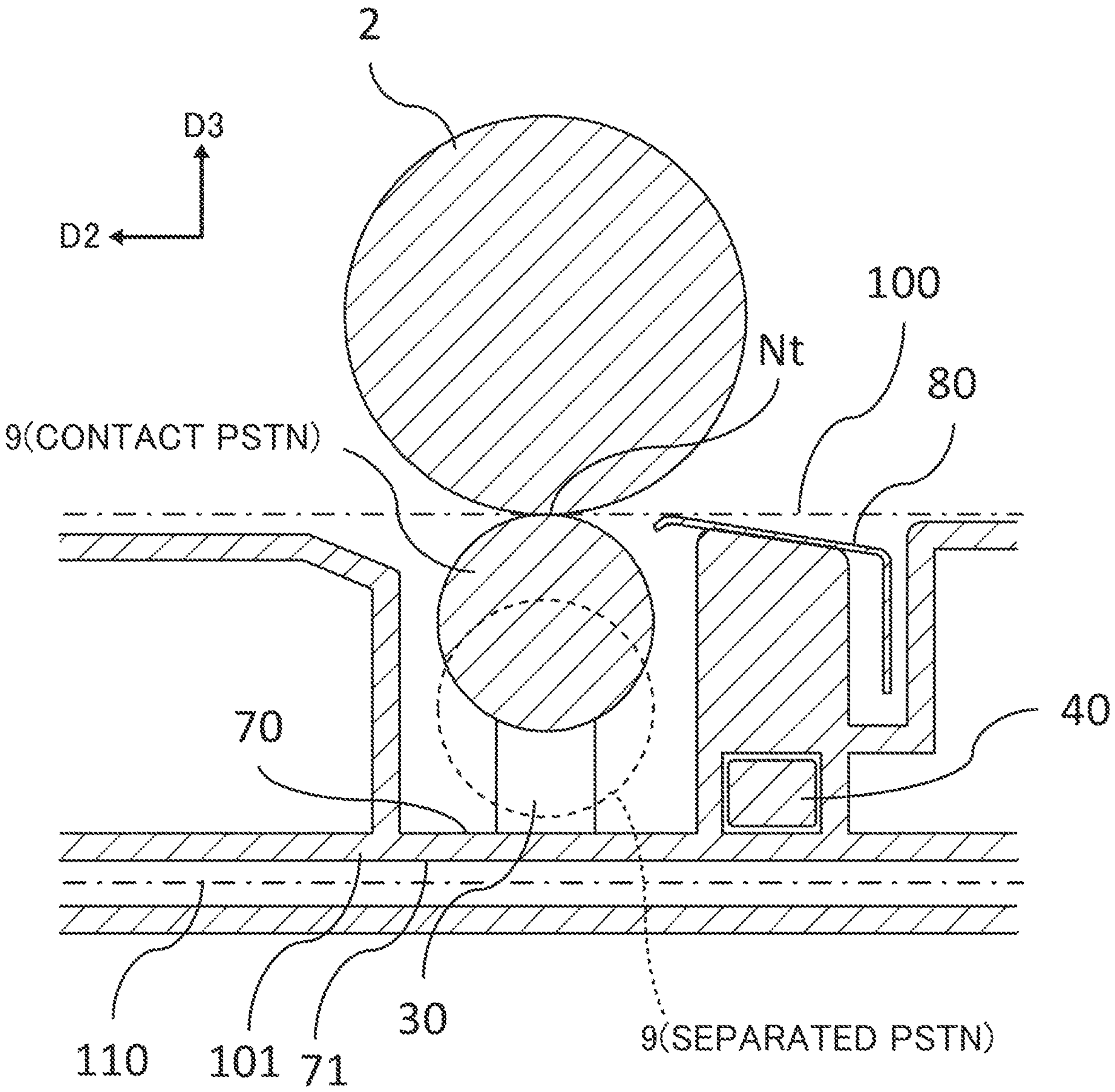
FIG. 7 is a cross-sectional view illustrating a portion of the image forming apparatus according to the Embodiment 1.

Next, disposition of the separation holding member 40 in the present Embodiment will be described. Part (a) and part (b) of FIG. 5 are views schematically illustrating a state in which a portion of the transfer roller 9, a portion of the first bearing 20 and the separation holding member 40 are viewed from upstream of the recording material conveyance direction D2. FIG. 6 is a view in which the photosensitive drum 2, the transfer roller 9, the transfer separation mechanism 90 and the releasing unit 60 are viewed from upstream of the recording material conveyance direction D2. FIG. 7 is a view schematically illustrating a cross-section of a portion of the image forming apparatus 1 sectioned by a virtual plane perpendicular to the rotational axis direction D1.

In part (a) and part (b) of FIG. 5 and FIG. 6, the transfer roller 9 is positioned in the separated position. In part (a) of FIG. 5, outlines of the transfer roller 9 and the first bearing 20 are illustrated as broken lines when the transfer roller 9 is positioned in the contact position, and in FIG. 7, an outline of the transfer roller 9 is illustrated as a broken line when the transfer roller 9 is positioned in the separated position. In addition, in part (a) of FIG. 5 and FIG. 6, the separation holding member 40 is positioned in the releasing position, and in part (b) of FIG. 5, the separation holding member 40 is positioned in the engaging position.

As shown in FIG. 6, the main body frame 101 includes a supporting surface 70 (attaching surface of the spring) for supporting the first pressing spring 30 and the second pressing spring 31. One end of each of the first pressing spring 30 and the second pressing spring 31 is supported by the supporting surface 70 and the other end of each of the first pressing spring 30 and the second pressing spring 31 is connected to the first bearing 20 and the second bearing 21, respectively. The main body frame 101 as a supporting member for the first pressing spring 30 and the second pressing spring 31 is disposed so as to be opposite to the first bearing 20 and the second bearing 21 in the pressing direction D3.

As shown in FIG. 6 and FIG. 7, at least a part of the separation holding member 40 is disposed on the same side (upper side in Figures) as the transfer roller 9 with respect to the main body frame 101 in the pressing direction D3. In addition, as shown in part (a) and part (b) of FIG. 5, and FIG. 6, as viewed in the recording material conveyance direction D2, the separation holding member 40 and the transfer roller 9 are overlapped with each other in a state in which the transfer roller 9 is positioned in the separated position. However, by two elements "are overlapped with each other as viewed in a predetermined direction", it means that a projected area of one element at least partially overlaps a projected area of the other element when each element is vertically projected onto a virtual plane perpendicular to the predetermined direction.

In other words, in the present Embodiment, it is configured that the transfer roller 9 and the separation holding member 40 are not aligned in the pressing direction D3, but the transfer roller 9 and the separation holding member 40 are aligned side-by-side in a direction crossing with the pressing direction D3.

Advantages of the above configuration will be described. As mentioned above, in the present Embodiment, it is configured that the one separation holding member 40 (moving member) engages both the first bearing 20 and the second bearing 21 and disengages from both the first bearing 20 and the second bearing 21 by moving in the moving direction E2 along the rotational axis direction D1. By this configuration, it becomes possible to make the mechanism (transfer separation mechanism 90) for holding the transfer roller 9 in the separated position be compact. On the other hand, the disposition of the separation holding member 40, which extends in the rotation axial direction D1 so as to engage both the first bearing 20 and the second bearing 21 positioned at both ends of the rotation axial direction D1, needs to be considered.

In a case of a configuration in which the transfer roller 9 and the separation holding member 40 are aligned in the pressing direction D3 (as a comparative example), the separation holding member 40 has to be disposed between the transfer roller 9 and the main body frame 101 in the pressing direction D3. However, considering the movement of the transfer roller 9, in the D3 pressing direction, the separation holding member 40 has to be disposed between the transfer roller 9 positioned in the separated position (broken line in FIG. 7) and the main body frame 101. In other words, a space for movement of the transfer roller 9 in the pressing direction D3 and the separation holding member 40 are disposed linearly in the pressing direction D3. Therefore, a distance between the photosensitive drum 2 and the main body frame 101 increases in the pressing direction D3, leading to an increase in the size of the image forming apparatus 1 in the pressing direction D3.

In contrast, in the present Embodiment, since it is configured that the separation holding member 40 and the transfer roller 9 are disposed side by side in the direction crossing the pressing direction D3, the main body frame 101 can be disposed in a position closer to the photosensitive drum 2 in the pressing direction D3 than in the configuration of the comparative example. By this, it becomes possible to downsize the image forming apparatus 1 in the direction (pressing direction D3) crossing both the rotational axis direction D1 and the recording material conveyance direction D2.

In other words, according to the present Embodiment, it becomes possible to provide the image forming apparatus which can be downsized.

In addition, in the present Embodiment, as shown in FIG. 7, in the pressing direction D3, a back surface of the supporting surface 70 of the main body frame 101, which supports the first pressing spring 30 and the second pressing spring 31, is a guide surface 71, which forms the second conveyance path 110. In other words, the supporting surface 70 is a surface opposite to the guide surface 71 with respect to the pressing direction D3 (moving direction of the transfer roller 9) in the main body frame 101 (supporting member). Incidentally, on the guide surface 71, ribs may be formed to guide the recording material more smoothly.

According to this configuration, a distance between the first conveyance path 100 (conveyance path which includes the transfer portion Nt) and the second conveyance path 110 in the pressing direction D3 can be narrowed, and it becomes possible to downsize the image forming apparatus 1 in the pressing direction D3.

Incidentally, in order to narrow the distance between the first conveyance path 100 and the second conveyance path 110 in the pressing direction D3, at least an inner part of a passing region W of the recording material (sheet passing area, see FIG. 6) in the separation holding member 40 should be disposed on the same side as the transfer roller 9 with respect to the supporting surface 70 in the pressing direction D3. For example, outside the passing region W of the recording material, a part of the separation holding member 40 may project toward the opposite side of the transfer roller 9 (downward side in FIG. 7) against the supporting surface 70.

The passing region W of the recording material is a range of the recording material in the rotational axis direction when the recording material with a maximum length in the rotational axis direction D1 (recording material widthwise direction), among the recording materials for which the image forming apparatus 1 can form the image, passes through the transfer portion Nt. In addition, in the present Embodiment, the passing region W shall be defined based on a state in which a center of the recording material in the rotational axis direction D1 coincides with a center of the transfer portion Nt in the rotational axis direction D1.

In addition, in the present Embodiment, the feeding tray 15 (accommodating portion), in which the recording material to be fed to the transfer portion Nt is accommodated, is positioned below the conveyance path (second conveyance path 110) formed by the guide surface 71 of the main body frame 101. In addition, the transfer portion Nt is positioned above the conveyance path (second conveyance path 110).

According to this configuration, a distance between the feeding tray 152 (accommodating portion) and the transfer portion Nt in the vertical direction can be reduced, and the size of the image forming apparatus 1 (height of the image forming apparatus 1) in the vertical direction can be reduced.

Figure 8:
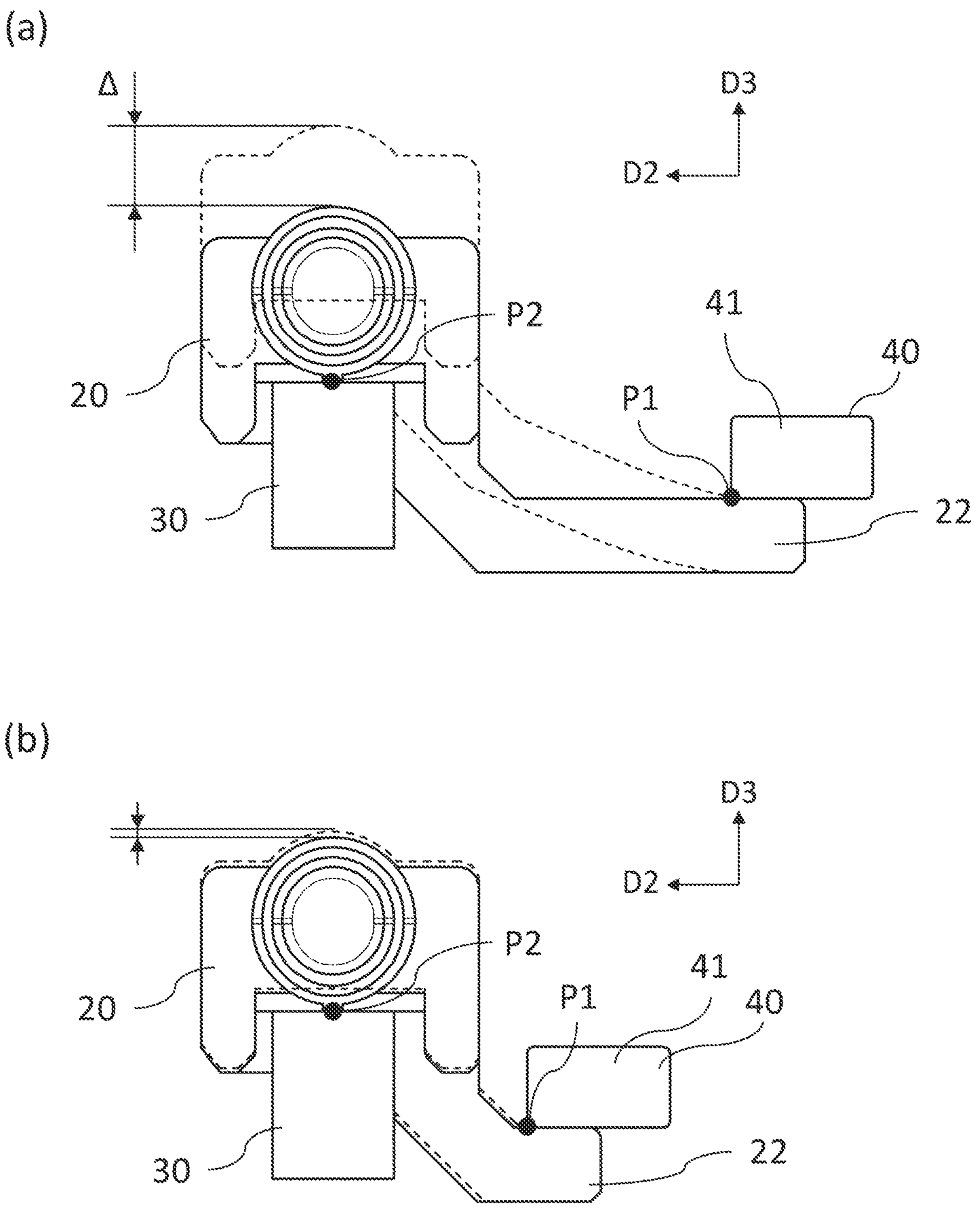
FIG. 8, part (a) and part (b), is a view to illustrate deformation of a first bearing.

A position of the separation holding member 40 in the recording material conveyance direction D2 will be described using part (a) and part (b) of FIG. 8. Part (a) of FIG. 8 is a view schematically illustrating an example of a configuration in which a distance from the separation holding member 40 to the first bearing 20 and the second bearing 21 in the recording material conveyance direction D2 is long. Part (b) of FIG. 8 is a view schematically illustrating an example of a configuration in which the distance from the separation holding member 40 to the first bearing 20 and the second bearing 21 in the recording material conveyance direction D2 is short.

In part (a) and part (b) of FIG. 8, it is assumed that the transfer roller 9 is held in the separated position by the transfer separating mechanism 90. An engaging position, at which the first engaging portion 41 of the separation holding member 40 engages the first hook portion 22 of the first bearing 20, is defined as P1. A point where force is applied, specifically, where the first bearing 20 receives the urging force from the first pressing spring 30 in the pressing direction D3, is defined as P2. The engaging position P1 is a point where force is applied, specifically, where the first hook portion 22 receives force from the separation holding member 40 in the opposite direction to the pressing direction D3.

In the present Embodiment, since the separation holding member 40 and the transfer roller 9 are disposed to align in the direction crossing the pressing direction D3, the engaging position P1 and the point where force applied P2 are separated from each other in the recording material conveyance direction D2. Therefore, the first hook portion 22 deforms so that the point where force is applied P2 moves in the pressing direction D3, with the engaging portion P1 functioning as a fulcrum.

Here, as shown by the broken line in part (a) of FIG. 8, in the case in which the distance from the engaging position P1 to the point where force applied P2 is long, a deformation amount A of the first hook portion 22 is likely to be large. When the first hook portion 22 is deformed, the transfer roller 9 will move in the pressing direction D3 even though the first engaging portion 41 of the separation holding member 40 engages the first hook portion 22 of the first bearing 20 at the certain engaging position P1. As a result, the distance between the transfer roller 9 and the photosensitive drum 2 becomes smaller, which may cause the aforementioned adverse effects caused by the contact between the transfer roller 9 and the photosensitive drum 2.

As shown in part (b) of FIG. 8, if the distance from the engaging position P1 to the point where force applied P2 is short, then it becomes possible to reduce the deformation amount A of the first hook portion 22. Similarly, if a distance from an engaging position, where the second engaging portion 42 of the separation holding member 40 engages the second hook portion 23 of the second bearing 21, to a point, where the second bearing 21 receives the urging force in the pressing direction D3 from the second pressing spring 31, is short, then it becomes possible to reduce the deformation amount of the second hook portion 23.

Therefore, as shown in FIG. 7, in the present Embodiment, the separation holding member 40 is disposed directly below a pre-transfer guide 80, which is provided just before the transfer portion Nt. The pre-transfer guide 80 is disposed upstream of the transfer portion Nt in the recording material conveyance direction D2 and is a guide member configured to guide the recording material to the transfer portion Nt. As viewed in the pressing direction D3 (moving direction of the transfer roller 9), the separation holding member 40 (moving member) and the pre-transfer guide 80 (guide member) are overlapped with each other.

Thus, by disposing the separation holding member 40 using a space directly below the pre-transfer guide 80, it becomes possible to reduce the deformation amount of the first hook portion 22 and the second hook portion 23, and to reduce possibility of the contact between the transfer roller 9 and the photosensitive drum 2. In addition, since the separated position of the transfer roller 9 does not need to be positioned farther away from the photosensitive drum 2 in consideration of the deformation of the first hook portion 22 and the second hook portion 23, it becomes possible to make the space for movement of the transfer roller 9 smaller, which is advantageous for downsizing the image forming apparatus 1.

In addition, in the present Embodiment, after the transfer roller 9 moves from the separated position to the contact position, the separation holding member 40 becomes unmovable from the releasing position to the engaging position, and no operation is performed to drive the transfer roller 9 from the contact position to the separated position via the separation holding member 40. In a case in which the transfer roller 9 is configured to be capable of being driven from the contact position to the separated portion by providing a cam surface, which engages the first hook portion 22 and the second hook portion 23, to the separation holding member 40, it is required for the separation holding member 40 to be rigid enough to withstand force received at the cam surface. In contrast, in the present Embodiment, no operation is performed to drive the transfer roller 9 from the contact position to the separated position via the separation holding member 40. Therefore, it is sufficient for the separation holding member 40 to have sufficient rigidity in vicinities of the engaging positions with the first hook portion 22 and the second hook portion 23 and in a vicinity of the contact position with the main body frame 101.

Specifically, the first engaging portion 41 of the separation holding member 40, which engages the first bearing 20, and the first main body contacting portion 45 (first contacting portion) of the separation holding member 40, which is in contact with the main body frame 101, are disposed on one side with respect to the passing region W (FIG. 6) of the recording material in the rotational axis direction D1. In addition, the second engaging portion 42 of the separation holding member 40, which engages the second bearing 21, and the second main body contacting portion 46 (second contacting portion) of the separation holding member 40, which is in contact with the main body frame 101, are disposed on the other side with respect to the passing region W (FIG. 6) of the recording material in the rotational axis direction D1.

According to this configuration, the separation holding member 40 has only to have rigidity to withstand the urging force from the first pressing spring 30 and the second pressing spring 31 at both end portions in the rotational axis direction D1. On the other hand, for the extending portion 400 (FIG. 2) of the separation holding member 40, which extends in the rotational axis direction D1 between the first engaging portion 41 and the second engaging portion 42, less rigidity is required than both end portions of the separation holding member 40 in the rotational axis direction D1, therefore it becomes possible to reduce, for example, a thickness of the plate.

Incidentally, as shown in FIG. 2 and FIG. 4, it is preferable that the first engaging portion 41 and the first main body contacting portion 45 be adjacent in the recording material conveyance direction D2, and the second engaging portion 42 and the second main body contacting portion 46 be adjacent in the recording material conveyance direction D2. The first engaging portion 41 and the first main body contacting portion 45 may be overlapped with each other in the pressing direction D3, and the second engaging portion 42 and the second main body contacting portion 46 may be overlapped with each other in the pressing direction D3.

In addition, in the present Embodiment, in the state in which the transfer roller 9 is positioned in the separated position indicated by the broken line, as viewed in the recording material conveyance direction D2 (FIG. 6), the urging member 43 (third urging member), which urges the separation holding member 40 (moving member), and the transfer roller 9 are overlapped with each other. By this configuration, it becomes possible to further downsize the image forming apparatus 1 by being able to dispose the urging member 43 (third urging member) for urging the separation holding member 40 by using a space which is overlapped with the transfer roller 9 as viewed in the recording material conveyance direction D2.

In addition, in the present Embodiment, in the state in which the transfer roller 9 is positioned in the separated position indicated by the broken line, as viewed in the recording material conveyance direction D2 (FIG. 6), the main body hook portion 49 (third engaging portion) of the separation holding member 40 (moving member) and the transfer roller 9 are overlapped with each other. By this configuration, it becomes possible to dispose the main body hook portion 49 (third engaging portion) for holding the separation holding member 40 to the main body frame 101 by using the space which is overlapped with the transfer roller 9 as viewed in the recording material conveyance direction D2. Thus, it becomes possible to further downsize the image forming apparatus 1.

Furthermore, in the present Embodiment, in the case in which the transfer roller 9 is positioned in the separated position indicated by the broken line, as viewed in the recording material conveyance direction D2 (FIG. 6), the retaining portion 47 (projecting shape) of the separation holding member 40 (moving member) and the transfer roller 9 are overlapped with each other. By this configuration, it becomes possible to dispose the retaining portion 47 (projecting shape) for restricting the falling off of the separation holding member 40 from the main body frame 101 by using the space which is overlapped with the transfer roller 9 as viewed in the recording material conveyance direction D2. Thus, it becomes possible to further downsize the image forming apparatus 1.

Embodiment 2

A configuration of an image forming apparatus according to an Embodiment 2 will be described using FIG. 9. In the present Embodiment, the disposition of the separation holding member 40 is different from the Embodiment 1. Hereinafter, elements with a common reference numeral with the Embodiment 1 are assumed to be provided with substantially the same configuration and action as those described in the Embodiment 1 unless otherwise mentioned, and parts which differ from the Embodiment 1 will be mainly described.

Figure 9:
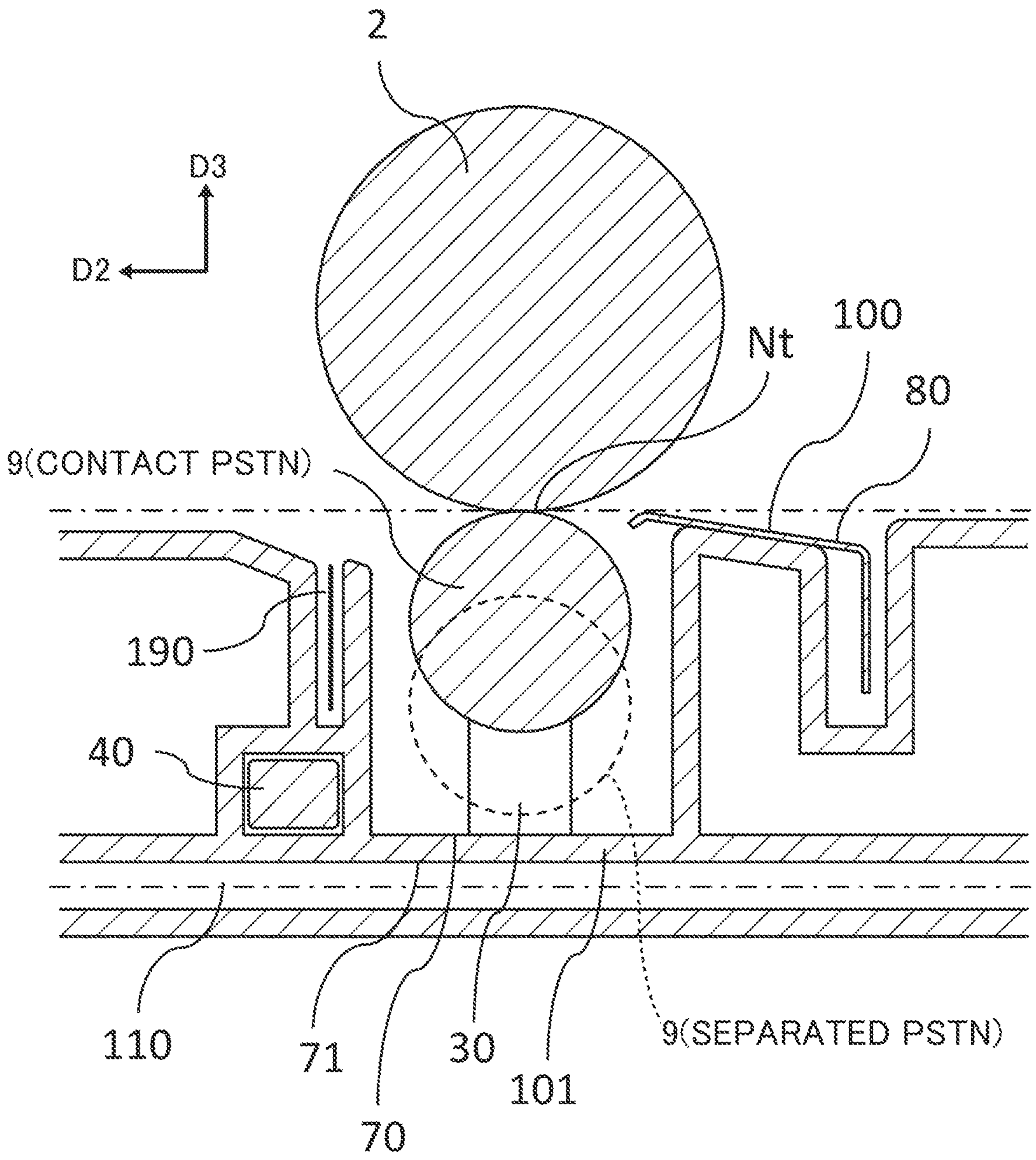
FIG. 9 is a cross-sectional view illustrating a portion of the image forming apparatus according to an Embodiment 2.

As shown in FIG. 9, the separation holding member 40 in the present Embodiment is disposed downstream of the transfer roller 9 with respect to the recording material conveyance direction D2. At least a part of the separation holding member 40 is disposed on the same side (upper side in Figure) of the transfer roller 9 with respect to the main body frame 101 in the pressing direction D3. In addition, in the state in which the transfer roller 9 is positioned in the separated position, as viewed in the recording material conveyance direction D2, the separation holding member 40 and the transfer roller 9 are overlapped with each other.

Therefore, it becomes possible to downsize the image forming apparatus 1 in the direction (pressing direction D3) crossing both with the rotational axis direction D1 and the recording material conveyance direction D2. In other words, according to the present Embodiment, it becomes possible to provide the image forming apparatus which can be downsized.

In addition, in the pressing direction D3, the back surface of the supporting surface 70 of the main body frame 101, which supports the first pressing spring 30 and the second pressing spring 31, is the guide surface 71, which forms the second conveyance path 110. In other words, the supporting surface 70 is a surface opposite to the guide surface 71 with respect to the pressing direction D3 (moving direction of the transfer roller 9) in the main body frame 101 (supporting member).

According to this configuration, the distance between the first conveyance path 100 (conveyance path which includes the transfer portion Nt) and the second conveyance path 110 in the pressing direction D3 can be narrowed, and it becomes possible to downsize the image forming apparatus 1 in the pressing direction D3.

In the present Embodiment, a static eliminating needle 190 is disposed downstream of the transfer portion Nt in the recording material conveyance direction D2. The static eliminating needle 190 is conductive and electrically grounded via a conductive path provided in the main body frame 101. The static eliminating needle 190 has a function of reducing an occurrence of an image defect due to excess charge by removing excess charge (electrically discharging) from the recording material by being in contact with the recording material which has passed through the transfer portion Nt.

In the present Embodiment, the separation holding member 40 is disposed directly below the static eliminating needle 190, which is provided immediately after the transfer portion Nt. The static eliminating needle 190 is disposed downstream of the transfer portion Nt in the recording material conveyance direction D2, and is an example of an electrically discharging member configured to electrically discharge the recording material in the transfer portion Nt. As viewed in the pressing direction D3 (moving direction of the transfer roller 9), the separation holding member 40 (moving member) and the static eliminating needle 190 (electrically discharging member) are overlapped with each other.

Thus, by disposing the separation holding member 40 using a space directly below the static eliminating needle 190, it becomes possible to reduce the deformation amount of the first hook portion 22 and the second hook portion 23, and to reduce the possibility of the contact between the transfer roller 9 and the photosensitive drum 2. In addition, since the separated position of the transfer roller 9 does not need to be positioned farther away from the photosensitive drum 2 in consideration of the deformation of the first hook portion 22 and the second hook portion 23, it becomes possible to make the space for movement of the transfer roller 9 smaller, which is advantageous for downsizing the image forming apparatus 1.

Embodiment 3

A configuration of an image forming apparatus according to an Embodiment 3 will be described using FIG. 10. In the present Embodiment, the configuration for releasing the holding of the transfer roller 9 by the transfer separating mechanism 90 is different from the Embodiment 1. Hereinafter, elements with a common reference numeral with the Embodiment 1 are assumed to be provided with substantially the same configuration and action as those described in the Embodiment 1 unless otherwise mentioned, and parts which differ from the Embodiment 1 will be mainly described.

Figure 10:
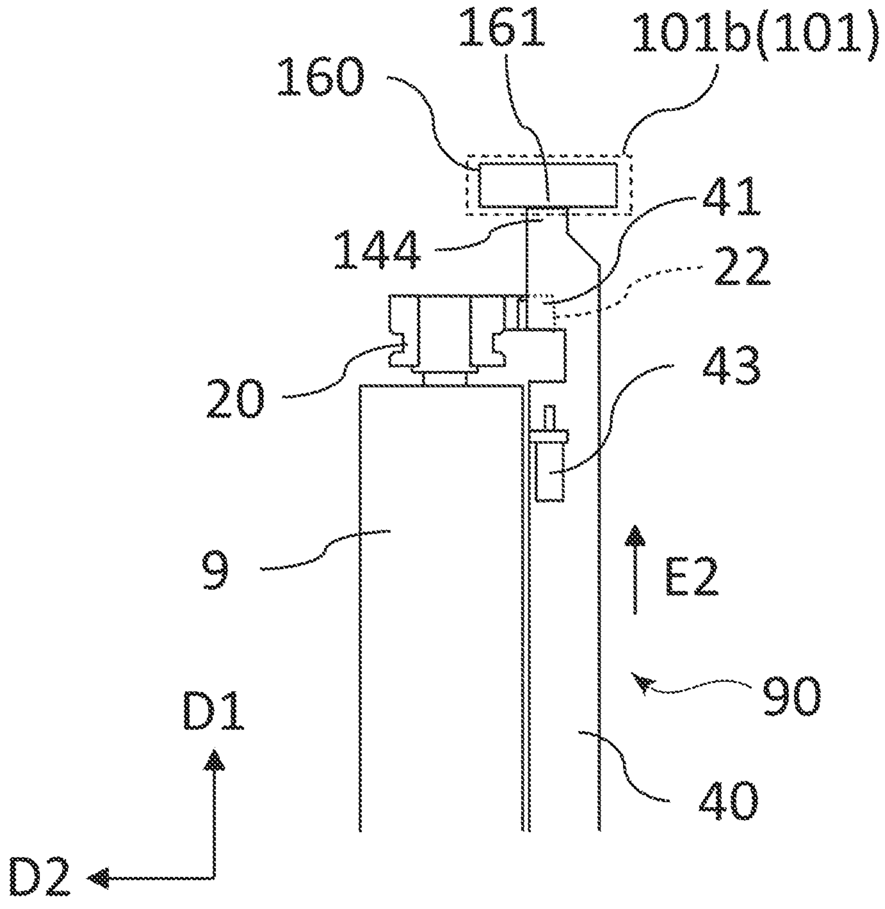
FIG. 10 is a view to illustrate a releasing unit according to an Embodiment 3.

FIG. 10 is a view illustrating a state in which the transfer roller 9, the first bearing 20 and the transfer separating mechanism 90 are viewed toward the opposite side of the pressing direction D3. The transfer separation mechanism 90 is provided with the separation holding member 40, the urging member 43, and a stopper member 160. As in the Embodiment 1, the one separation holding member 40 engages both the first bearing 20 and the second bearing 21. The movement of the transfer roller 9 from the separated position to the contact position is permitted by the separation holding member 40 moving in the moving direction E2 along the rotational axis direction D1 from the engaging position (position viewed in FIG. 10) to the releasing position.

In the present Embodiment, the stopper member 160 is used instead of the slider member 50 of the Embodiment 1 as a mechanism (restricting means) for holding the separation holding member 40 in the engaging position. The stopper member 160 includes a contacting surface 161, which is in contact with an end portion 144 of the separation holding member 40 in the moving direction E2, and holds the separation holding member 40 in the engaging position against the urging force of the urging member 43 in the moving direction E2.

The stopper member 160 is mounted on a mounting portion **101*b* of the apparatus main body 1B (main body frame 101) in a demountable state during the assembly of the image forming apparatus 1. The stopper member 160 is then removed before a use of the image forming apparatus 1 is begun. As a result, since the movement of the separation holding member 40 in the moving direction E2 is permitted, the separation holding member 40 moves from the engaging position to the releasing position according to the force of the urging member 43. And by the first engaging portion 41 and the second engaging portion 42 of the separation holding member 40 being disengaged from the first hook portion 22 of the first bearing 20 and the second hook portion 23 of the second bearing 21, the transfer roller 9** moves from the separated position to the contact position.

Thus, in the present Embodiment, the stopper member 160 is used as the restricting means and a restriction releasing means of the movement in the moving direction E2 of the separation holding member 40. As in the Embodiment 1, in the configuration in which the one separation holding member 40 engages both the first bearing 20 and the second bearing 21, by restricting the position of the separation holding member 40, the positions of both the first bearing 20 and the second bearing 21 can be simultaneously restricted. By taking advantage of this high degree of design freedom, the positions of the first bearing 20 and the second bearing 21 can be restricted with a simpler and more compact configuration than the releasing unit 60 of the Embodiment 1.

Incidentally, in the present Embodiment, the configuration in which the stopper member 160 is removable from the apparatus main body 1B is desired; however, the stopper member 160 may be configured to remain in the state mounted on the apparatus main body 1B and to be moved to a position permitting the movement of the separation holding member 40.

Other Embodiments

In the Embodiments described above, it is described by exemplifying the mono-color image forming apparatus using a single process cartridge, however, the present disclosure is not limited to this configuration, but can be applied to a full-color image forming apparatus using multiple process cartridges. In addition, in the Embodiments described above, the image forming apparatus of a direct transfer method, in which an image is transferred directly from the photosensitive drum as the image bearing member to the recording material, is exemplified, however, the configurations of the present disclosure may be applied to an image forming apparatus of an intermediary transfer method. In this case, an image formed on a photosensitive drum is primarily transferred to an image bearing member (intermediary transfer member), and then secondarily transferred from the image bearing member (intermediary transfer member) to the recording material by a transfer member.

In addition, in the Embodiments described above, it is described by exemplifying the image forming apparatus capable of double-side printing by being provided with the second conveyance path 110, however, the configurations of the present disclosure may be applied to an image forming apparatus only capable of single-side printing without the second conveyance path 110. Even in this case, it is possible to downsize the image forming apparatus with respect to the moving direction of the transfer member.

In addition, in the Embodiments described above, it is described by exemplifying the image forming apparatus of a so-called S-path configuration. The S-path configuration is a configuration in which the recording material is fed from the feeding tray 15 toward one side of the horizontal direction, the recording material is conveyed through the transfer portion Nt above the feeding tray 15 toward the other side of the horizontal direction, and the recording material is discharged above the transfer portion Nt toward the one side of the horizontal direction. Not limited to this configuration, the configurations of the present disclosure may be applied to an image forming apparatus of a so-called C-path configuration. The C-path configuration is a configuration in which the recording material is fed from the feeding tray 15 toward one side of the horizontal direction, the recording material passes through the transfer portion Nt while being conveyed toward upper direction, and the recording material is discharged toward the other side of the horizontal direction. In a case of the image forming apparatus of the C-pass configuration, there is a case in which it is possible to downsize the image forming apparatus in the horizontal direction as viewed in the rotational axis direction of the transfer roller 9 by the configurations of the present disclosure.

In addition, in the Embodiments described above, a printer is exemplified as the image forming apparatus, however, the present disclosure is not limited thereto. For example, the image forming apparatus may be another image forming apparatus such as a copy machine and facsimile device, or another image forming apparatus such as a multifunction machine combining these functions. The configurations of the present disclosure may be applied to a transfer separating mechanism used in these image forming apparatuses.

SUMMARY OF THE DISCLOSURE

The present disclosure includes at least the following structures.

(Structure 1)

An image forming apparatus comprising:

- a rotatable image bearing member configured to bear an image;
- a rotatable transfer member configured to form a transfer portion between itself and the image bearing member and to transfer the image from the bearing member to a recording material in the transfer portion, the transfer member being movable between a contact position in contact with the image bearing member and a separated position separated from the image bearing member in a moving direction crossing both a rotational axis direction of the transfer member and a recording material conveyance direction in the transfer portion;
- a first bearing configured to rotatably support a first end portion of the transfer member in the rotational axis direction and movably provided in the moving direction;
- a second bearing configured to rotatably support a second end portion of the transfer member in the rotational axis direction and movably provided in the moving direction;
- a supporting member opposing the first bearing and the second bearing with respect to the moving direction;
- a first urging member of which one end is supported by the supporting member and the other end is connected to the first bearing and configured to urge the first bearing in a direction from the separated position toward the contact position of the transfer member;
- a second urging member of which one end is supported by the supporting member and the other end is connected to the second bearing and configured to urge the second bearing in the direction from the separated position toward the contact position of the transfer member; and
- a moving member provided with a first engaging portion engaging with the first bearing and a second engaging portion engaging the second bearing and movably provided in a direction along the rotational axis direction between a first position where the first engaging portion engages with the first bearing and the second engaging portion engages with the second bearing so as to hold the transfer member at the separated position and a second position where the first engaging portion is disengaged from the first bearing and the second engaging portion is disengaged from the second bearing so as to permit the transfer member to move from the separated position to the contact position, wherein at least a part of the moving member is disposed on the same side as the transfer member with respect to the supporting member in the moving direction, and wherein as viewed in the recording material conveyance direction, the moving member and the transfer member are overlapped with each other in a state in which the transfer member is positioned in the separated position.

(Structure 2)

An image forming apparatus according to Structure 1, further comprising a guide member disposed upstream of the transfer member in the recording material conveyance direction and configured to guide the recording material to the transfer portion, wherein as viewed in the moving direction, the moving member and the guide member are overlapped with each other.

(Structure 3)

An image forming apparatus according to Structure 1, further comprising an electrically discharging member disposed downstream of the transfer portion in the recording material conveyance direction and configured to electrically discharge the recording material, wherein as viewed in the moving direction, the moving member and the electrically discharging member are overlapped with each other.

(Structure 4)

An image forming apparatus according to Structure 2 or 3, wherein the first bearing includes a first engaged portion engaged with the first engaging portion, wherein the second bearing includes a second engaged portion engaged with the second engaging portion, and wherein the first engaged portion and the second engaged portion are formed so as to project in a direction crossing both the rotational axis direction and the moving direction.

(Structure 5)

An image forming apparatus according to any one of Structures 1 to 3, wherein the supporting member includes a supporting surface for supporting the first urging member and the second urging member, and a guide surface for forming a conveyance path along which the recording material, of which a first side is transferred with the image in the transfer portion, is again conveyed toward the transfer portion in order to. transfer an image to a second side thereof opposite to the first side, and wherein the supporting surface is a surface opposite to the guide surface with respect to the moving direction.

(Structure 6)

An image forming apparatus according to Structure 5, wherein of the moving member, an inner part of a passing region where the recording material passes through the transfer portion in the rotational axis direction is disposed on the same side as the transfer member with respect to a position of the supporting surface in the moving direction.

(Structure 7)

An image forming apparatus according to Structure 5 or 6, further comprising an accommodating portion configured to accommodate the recording material fed toward the transfer portion, wherein the accommodating portion is positioned below the conveyance path and the transfer portion is positioned above the conveyance path.

(Structure 8)

An image forming apparatus according to any one of Structures 1 to 7, further comprising a third urging member configured to urge the moving member from the first position toward the second position. and restricting means for restricting movement of the moving member from the first position toward the second position.

(Structure 9)

An image forming apparatus according to Structure 8, further comprising a releasing unit configured to release restriction by the restricting means, wherein the restricting means is movable in a direction crossing the rotational axis between a third position where the restricting means restricts the movement of the moving member from the first position to the second position and a fourth position where the restricting means permits the movement of the moving member from the first position to the second position, and wherein the releasing unit includes a driving source and a driving member configured to cause the restricting means to move the third position to the fourth position by a driving force of the driving source.

(Structure 10)

An image forming apparatus according to any one of Structures 1 to 9, wherein the moving member is constituted so as to be unmovable from the second position to the first position after the moving member has moved from the first position to the second position and the transfer member moves from the separated position to the contact position.

(Structure 11)

An image forming apparatus according to Structure 10, wherein the moving member includes an extending portion extending in the rotational axis direction between the first engaging portion and the second engaging portion, and a first contacting member and a second contacting member contacting a frame member of the image forming apparatus, respectively, wherein in a case in which the moving member is positioned in the first position, each urging force of the first urging member and the second urging member is received by the frame member by contacting of the first contacting portion and the second contacting portion with the frame member, wherein the first engaging portion and the first contacting portion are disposed on one side with respect to a passing region where the recording material passes through the transfer portion in the rotational axis direction, and wherein the second engaging portion and the second contacting portion are disposed on the other side with respect to the passing region in the rotational axis direction.

(Structure 12)

An image forming apparatus according to any one of Structures 1 to 11, further comprising a third urging member configured to urge the moving member in a direction from the first position toward the second position, wherein in a state in which the transfer member is positioned in the separated position, as viewed in the recording material conveyance direction, the third urging member and the transfer member are overlapped with each other.

(Structure 13)

An image forming apparatus according to any one of Structures 1 to 12, wherein the moving member includes an extending portion extending in the rotational axis direction between the first engaging portion and the second engaging portion, and a third engaging portion configured to engage with a third engaged portion provided on a frame member of the image forming apparatus, and is held by the frame member by engaging of the third engaging portion with the third engaged portion, and wherein in a state in which the transfer member is positioned in the separated position, as viewed in the recording material conveyance direction, the third engaging portion and the transfer member are overlapped with each other.

(Structure 14)

An image forming apparatus according to Structure 13, wherein the moving member includes a projecting shape projecting from the extending portion in a direction crossing to the rotational axis direction and configured to restrict falling of the moving member from the frame member, wherein in a state in which the transfer member is positioned in the separated position, as viewed in the recording material conveyance direction, the projecting shape and the transfer member are overlapped with each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-010974 filed on Jan. 27, 2023, which is hereby incorporated by reference herein in its entirety.

What is claimed is:

1. An image forming apparatus comprising:

a rotatable image bearing member configured to bear an image;

a rotatable transfer member configured to form a transfer portion between itself and the image bearing member and to transfer the image from the bearing member to a recording material in the transfer portion, the transfer member being movable between a contact position in contact with the image bearing member and a separated position separated from the image bearing member in a moving direction crossing both a rotational axis direction of the transfer member and a recording material conveyance direction in the transfer portion;

a first bearing configured to rotatably support a first end portion of the transfer member in the rotational axis direction and movably provided in the moving direction;

a second bearing configured to rotatably support a second end portion of the transfer member in the rotational axis direction and movably provided in the moving direction;

a supporting member opposing the first bearing and the second bearing with respect to the moving direction;

a first urging member of which one end is supported by the supporting member and the other end is connected to the first bearing and configured to urge the first bearing in a direction from the separated position toward the contact position of the transfer member;

a second urging member of which one end is supported by the supporting member and the other end is connected to the second bearing and configured to urge the second bearing in the direction from the separated position toward the contact position of the transfer member; and a moving member provided with a first engaging portion engaging with the first bearing and a second engaging portion engaging with the second bearing and movably provided in a direction along the rotational axis direction between a first position where the first engaging portion engages with the first bearing and the second engaging portion engages with the second bearing so as to hold the transfer member at the separated position and a second position where the first engaging portion is disengaged from the first bearing and the second engaging portion is disengaged from the second bearing so as to permit the transfer member to move from the separated position to the contact position, wherein at least a part of the moving member is disposed on the same side as the transfer member with respect to the supporting member in the moving direction, and wherein as viewed in the recording material conveyance direction, the moving member and the transfer member are overlapped with each other in a state in which the transfer member is positioned in the separated position.

2. An image forming apparatus according to claim 1, further comprising a guide member disposed upstream of the transfer member with respect to the recording material conveyance direction and configured to guide the recording material to the transfer portion, wherein as viewed in the moving direction, the moving member and the guide member are overlapped with each other.

3. An image forming apparatus according to claim 1, further comprising an electrically discharging member disposed downstream of the transfer portion in the recording material conveyance direction and configured to electrically discharge the recording material, wherein as viewed in the moving direction, the moving member and the electrically discharging member are overlapped with each other.

4. An image forming apparatus according to claim 2, wherein the first bearing includes a first engaged portion engaged with the first engaging portion, wherein the second bearing includes a second engaged portion engaged with the second engaging portion, and wherein the first engaged portion and the second engaged portion are formed so as to project in a direction crossing both the rotational axis direction and the moving direction.

5. An image forming apparatus according to claim 1, wherein the supporting member includes a supporting surface for supporting the first urging member and the second urging member, and a guide surface for forming a conveyance path along which the recording material, to a first side of which the image has been transferred in the transfer portion, is again conveyed toward the transfer portion in order to transfer an image to a second side thereof opposite to the first side, and wherein the supporting surface is a surface opposite to the guide surface with respect to the moving direction.

6. An image forming apparatus according to claim 5, wherein of the moving member, an inner part of a passing region where the recording material passes through the transfer portion in the rotational axis direction is disposed on the same side as the transfer member with respect to a position of the supporting surface in the moving direction.

7. An image forming apparatus according to claim 5, further comprising an accommodating portion configured to accommodate the recording material to be fed toward the transfer portion, wherein the accommodating portion is positioned below the conveyance path and the transfer portion is positioned above the conveyance path.

8. An image forming apparatus according to claim 1, further comprising:

a third urging member configured to urge the moving member from the first position toward the second position, and restricting means for restricting movement of the moving member from the first position toward the second position.

9. An image forming apparatus according to claim 8, further comprising a releasing unit configured to release restriction by the restricting means, wherein the restricting means is movable in a direction crossing the rotational axis direction between a third position where the restricting means restricts the movement of the moving member from the first position to the second position and a fourth position where the restricting means permits the movement of the moving member from the first position to the second position, and wherein the releasing unit includes a driving source and a driving member configured to cause the restricting means to move from the third position to the fourth position by a driving force of the driving source.

10. An image forming apparatus according to claim 1, wherein the moving member is constituted so as to be unmovable from the second position to the first position after the moving member has moved from the first position to the second position and the transfer member moves from the separated position to the contact position.

11. An image forming apparatus according to claim 10, wherein the moving member includes an extending portion extending in the rotational axis direction between the first engaging portion and the second engaging portion, and a first contacting member and a second contacting member contacting a frame member of the image forming apparatus, respectively, wherein in a case in which the moving member is positioned in the first position, each of urging forces of the first urging member and the second urging member is received by the frame member by contacting of the first contacting portion and the second contacting portion with the frame member, wherein the first engaging portion and the first contacting portion are disposed on one side with respect to a passing region where the recording material passes through the transfer portion in the rotational axis direction, and wherein the second engaging portion and the second contacting portion are disposed on the other side with respect to the passing region in the rotational axis direction.

12. An image forming apparatus according to claim 1, further comprising a third urging member configured to urge the moving member in a direction from the first position toward the second position, wherein in a state in which the transfer member is positioned in the separated position, as viewed in the recording material conveyance direction, the third urging member and the transfer member are overlapped with each other.

13. An image forming apparatus according to claim 1, wherein the moving member includes an extending portion extending in the rotational axis direction between the first engaging portion and the second engaging portion, and a third engaging portion configured to engage with a third engaged portion provided on a frame member of the image forming apparatus, and is held by the frame member by engaging of the third engaging portion with the third engaged portion, and wherein in a state in which the transfer member is positioned in the separated position, as viewed in the recording material conveyance direction, the third engaging portion and the transfer member are overlapped with each other.

14. An image forming apparatus according to claim 13, wherein the moving member includes a projecting shape projecting from the extending portion in a direction crossing the rotational axis direction and configured to restrict falling of the moving member from the frame member, wherein in a state in which the transfer member is positioned in the separated position, as viewed in the recording material conveyance direction, the projecting shape and the transfer member are overlapped with each other.

* * * * *